United States Patent [19]
Johnston

[11] 3,883,980
[45] May 20, 1975

[54] MOUSETRAP

[76] Inventor: Steve H. Johnston, 428 Stradford Ave., Apt. 4D, Brooklyn, N.Y. 11218

[22] Filed: Mar. 11, 1974

[21] Appl. No.: 449,635

[52] U.S. Cl. .................................................... 43/69
[51] Int. Cl. ............................................ A01m 23/04
[58] Field of Search ................................. 43/69, 70

[56] References Cited
UNITED STATES PATENTS

| | | | |
|---|---|---|---|
| 376,246 | 1/1888 | Kunderd | 43/69 |
| 858,604 | 7/1907 | Jacobs | 43/69 |
| 999,751 | 8/1911 | Clow | 43/69 |
| 1,032,089 | 7/1912 | Spirikowicz | 43/69 |

Primary Examiner—Warner H. Camp

[57] ABSTRACT

A vertical shaft supporting at its top end a small horizontal disc defining a regular polygon of N sides extends upward from the center of a much larger horizontal member also defining a regular polygon of N sides. Means disposed about the shaft in a horizontal plane in a position intermediate the ends defines a regular polygon of N sides smaller than the member, larger than the disc and centered on the shaft. Twelve like plates extend between the means and the member to enclose same leaving only a top opening. Twelve normally closed access doors are pivotally secured to the means, close the top opening and overlie the plates.

1 Claim, 2 Drawing Figures

MOUSETRAP

SUMMARY OF THE INVENTION

My invention is directed to a new type of mouse trap which uses a minimum number of parts, can be approached and activated from any direction, and traps the mouse alive.

The invention takes the form of a vertical hollow structure resembling a vertical truncated cone with a large base resting on a suitable horizontal surface and a small top end upon which bait can be placed. The structure is not a cone but actually is a regular polygon. The top portions of the inclined side walls of this structure are open but are covered by normally closed access doors pivotably opened by the weight of a mouse walking thereon.

The door so walked on pivots to cause the mouse to fall downward into the hollow interior and then automatically returns to closed position by gravity action to trap the mouse.

DETAILED DESCRIPTION OF PREFERRED EMBODIMENTS

Figure 1:
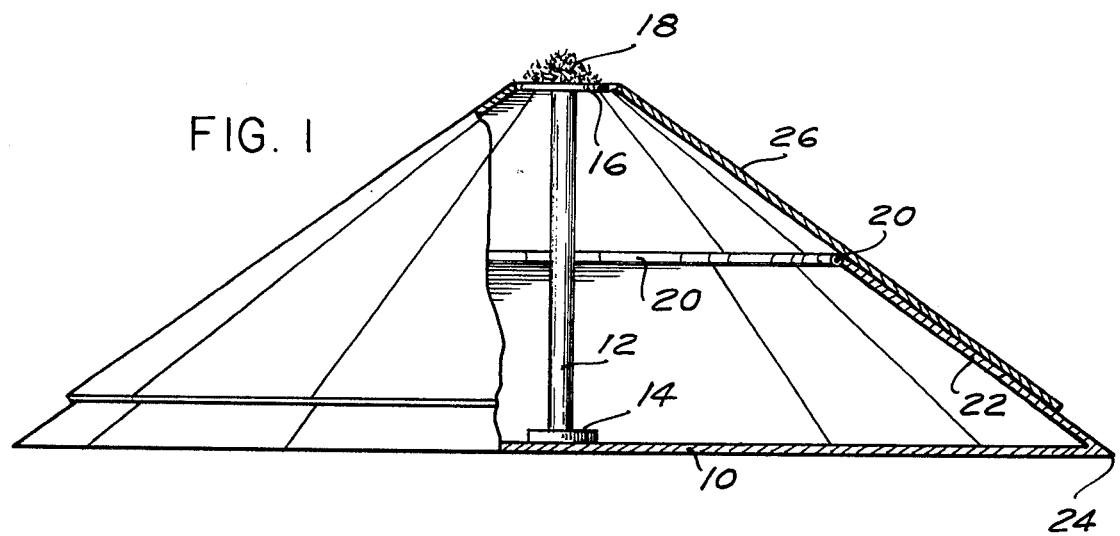
FIG. 1 is a partially cut away side view of the invention.
Figure 2:
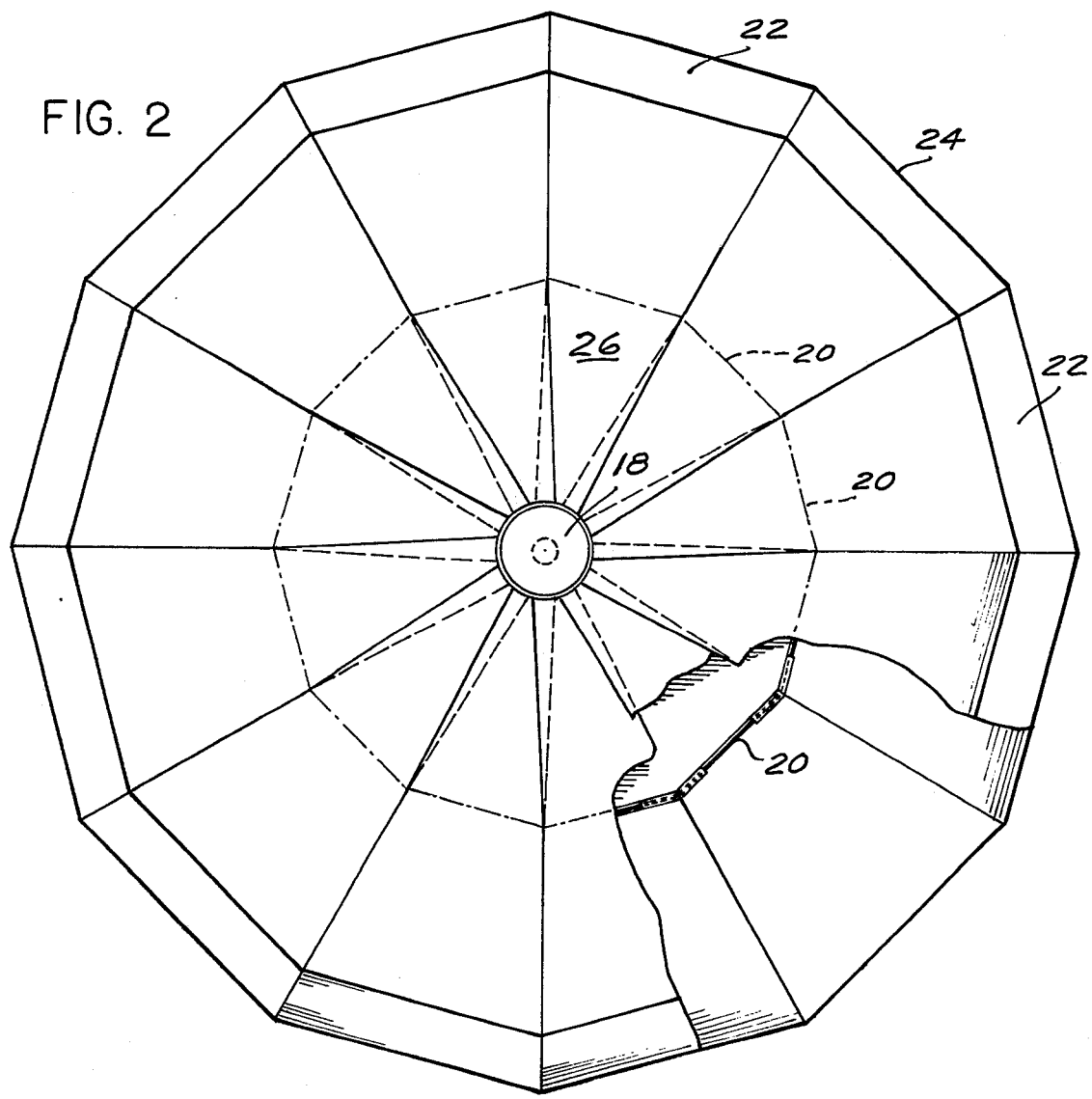
FIG. 2 is a top view thereof.

Referring now to FIGS. 1 and 2, a flat horizontal member 10 defines a regular polygon of 12 sides 24.

A vertical shaft 12 has an enlarged bottom end 14 secured to the center of member 10 and extends upward to support at its top end a horizontal disc 16 of like polygonal shape centered on the shaft. The area of the disc is very small and bait 18 can be removably disposed thereon.

A horizontal ring like member has 12 sides 20 of like length and is centered on the shaft. These sides are shorter than the sides of the member and are disposed inwardly therefrom. The member is disposed intermediate the ends of the shaft, typically midway.

Twelve plates 22 each have upper horizontal edges joined to corresponding sides 20 and are of like length. Plates 22 also have lower horizontal edges joined to corresponding sides 24 and are of like length. The sides of each plate are joined to the sides of the adjacent plates whereby a hollow enclosed structure open at the top is formed.

Twelve access doors 26 are each pivotally secured at midpoint to a corresponding side 20. Each door is inclined downwardly and outwardly with a top edge disposed adjacent and aligned with a corresponding edge of disc 16, and side edges adjacent sides of adjacent doors. The bottom or lower portion of each door overlies the corresponding plate 22.

When a mouse attempts to climb up along any plate 22 and any door 26 to reach the bait, as the mouse approaches the disc the weight on the door pivots the top portion downward, and the mouse falls into the enclosure. The door then returns by gravity to its original normal closed position and the mouse is trapped alive.

Any polygon of three sides or more can be used. Best results are obtained by using a relatively large number of sides.

While I have described my invention with particular reference to the drawings, such is not to be considered as limiting its actual scope.

Having thus described the invention, what is asserted as new is:

1. A mouse trap employing bait and comprising:
a horizontal flat base member defining a regular polygon of N sides where N is an integer in excess of two;
a vertical shaft secured to the center of the member and extending vertically upward;
a small flat horizontal disc secured to the top end of the shaft and centered thereon, said disc defining the same shape of N sided regular polygon as said member but having a much smaller area, whereby each side of the disc is much shorter than the corresponding side of the member, said bait being disposed removably on top of said disc;
means disposed horizontally about the shaft at a point intermediate the ends of the shaft and having a periphery defining a regular polygon centered on said shaft, said polygon also having the same N sides and shape as the disc and member, each side of the means polygon being shorter than the corresponding side of the member and longer than the corresponding side of the disc;
N like outwardly and downwardly extending plates secured at side edges to each other, each plate being secured at its top edge to a corresponding side of the means and at its bottom edge to a corresponding side of the member, said plates peripherally enclosing and extending between the means and member; and
N like normally closed trap doors disposed between the means and disc, there being minimal separation between the doors, each door inclining downwardly and outwardly with a top edge adjacent but spaced from a corresponding side of the disc, each door being pivotally secured at a point intermediate its ends to a corresponding side of the means, the bottom edge of each door overlapping the top edge of a corresponding plate whereby the doors are normally closed by weight of gravity, any door when a mouse steps thereon, being caused to open because of the weight of the mouse, thus causing the mouse to fall through the means upon the member and be trapped alive.

* * * * *